(12) United States Patent
Toda

(10) Patent No.: US 6,317,217 B1
(45) Date of Patent: Nov. 13, 2001

(54) PRINTING SYSTEM AND PRINTING CONTROL METHOD

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/028,343

(22) Filed: Feb. 24, 1998

(51) Int. Cl.[7] ............... B41B 15/00; B41J 15/00; H04N 1/00; G06K 9/18
(52) U.S. Cl. .......... 358/1.11; 358/1.1; 358/1.13; 358/1.15; 358/1.16; 358/404; 382/185
(58) Field of Search .............. 358/1.11, 1.1, 358/1.13, 1.15, 1.16, 404; 382/185

(56) References Cited

U.S. PATENT DOCUMENTS

| | | | |
|---|---|---|---|
| 4,728,209 | * 3/1988 | Kumamoto et al. | 400/697.1 |
| 4,829,583 | * 5/1989 | Monroe et al. | 382/185 |
| 5,732,197 | * 3/1998 | Nakagiri | 358/1.11 |

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A host computer extracts characters from print data, assigns IDs in units of characters, forms a character set with a predetermined length, and stores the IDs and images in correspondence with each other. Character data to be transferred to a printer is indicated by its position and character ID, and other data to be transferred to the printer are mapped as an image, which is compressed in units of band images. Both the character data and band image data are generated to have the predetermined length, with the obtained data being transmitted to the printer. The printer controls data read/write in units of predetermined lengths, and an empty area is released. Since the empty area is managed in units of predetermined lengths, all the data received from the host computer can be stored in that area. Hence, the printer neither needs map characters nor collects unused areas.

32 Claims, 13 Drawing Sheets

FIG.9

DRIVER MANAGEMENT CHARACTER SET STRUCTURE

| CHARACTER ID | minPage | maxPage | Charp | CharSetID | Offset |
|---|---|---|---|---|---|
| 901 | 902 | 903 | 904 | 905 | 906 |

| CHARACTER ID | minPage | maxPage | Charp | CharSetID | Offset |
|---|---|---|---|---|---|
| 1001 | 1002 | 1003 | 1004 | 1005 | 1006 |
| 1 | 1 | 5 | Charp | CharSetID | Offset |
| 2 | 1 | 1 | Charp | CharSetID | Offset |
| 3 | 2 | 2 | Charp | CharSetID | Offset |
| 4 | 2 | 4 | Charp | CharSetID | Offset |
| 5 | 3 | 3 | Charp | CharSetID | Offset |
| 6 | 3 | 5 | Charp | CharSetID | Offset |
| 7 | 1 | 5 | Charp | CharSetID | Offset |
| 8 | 5 | 5 | Charp | CharSetID | Offset |

PRINTING SYSTEM AND PRINTING CONTROL METHOD

BACKGROUND OF THE INVENTION

1. Field of the Invention

The present invention relates to a printing system including a printing apparatus that operates by receiving print information from a host computer and a printing control method and, more particularly, to a printing system including a printing apparatus having a printer control function called a printer description language, printer control commands, and the like, and software programs called a printer driver or a print spooler or print processor prepared for that printing apparatus on the host computer side, and a printing control method.

2. Related Art

As recent printing apparatuses, printers that can finely print and record data used in multimedia processing in the fields of CAD (computer aided design), CG (computer graphics), DTP (desktop publishing) in design and business fields, and the like are commercially available.

Such printers include a PDL printer which draws (rasterizes)an image from intermediate language codes, generated by interpreting PDL (page description language) codes received from a host computer, at high speed using hardware or software, and an image printer which receives image data which is rasterized by a host computer and has a data format that the printer can print, since some printer functions are removed to attain a cost reduction.

The PDL printer receives information in a page as PDL codes, generates intermediate language codes, and draws an image after codes for one page have been received.

Characters are drawn by using font data stored in an internal ROM of the printer or using image data which is obtained by mapping font data and received from a host computer. Recently, in order to obtain the same print result as that displayed on a display, the image data received from the host computer is often used.

However, when all the characters are transferred as image data from the host to the printer, the load of a mapping process in the host and the transfer data volume increases. Further, large memory capacity is required in the printer for storing the received image data.

SUMMARY OF THE INVENTION

It is an object of the present invention to provide a printing system and printing control method, which can minimize the mapping time of characters at a host computer and the transfer data amount from the host computer by mapping the received character code of each character as a character image even using an image dedicated printer with a simple arrangement close to the above-mentioned image printer, and can reduce and efficiently use the memory capacity of a printing apparatus.

In order to achieve the above object, the present invention comprises the following arrangement.

That is, there is provided a printing system built by connecting an information processing apparatus for generating print data including character data, and a printing apparatus, the information processing apparatus comprising:

character extraction means for extracting character data from print data for one print job;

first storage searchably storing a registration number and a character image of the character data extracted by the character extraction means, and a page where the character data appears;

character set generation means for generating character set data, which includes a registration number and character image of a character, and has a predetermined length, on the basis of the character data stored in the first storage in accordance with a page to be printed; and transmission means for generating a character draw command including a registration number of a character in units of pages to be printed, and transmitting the character draw command, character set data, and a delete command used for deleting character set data to the printing apparatus, and the printing apparatus comprising:

second storage storing the received character draw command, character set data, and delete command;

management means for managing data write and delete in and from the second storage in units of areas each having the predetermined length; and output means for forming an image in units of pages on the basis of the character draw command, character set data, and delete command stored in the second.

There is also provided a printing control apparatus for generating print data including character data, and making a printing apparatus print an image, comprising:

character extraction means for extracting character data from print data for one print job;

storage searchably storing a registration number and a character image of the character data extracted by the character extraction means, and a page where the character data appears;

character set generation means for generating character set data, which includes a registration number and character image of a character, and has a predetermined length, on the basis of the character data stored in the storage in accordance with a page to be printed; and transmission means for generating a character draw command including a registration number of a character in units of pages to be printed, and transmitting the character draw command, character set data, and a delete command used for deleting character set data to the printing apparatus.

There is also provided a printing apparatus for receiving a character draw command, character set data, and a delete command for the character set data, and printing an image, comprising:

storage storing the received character draw command, character set data, and delete command;

management means for managing data write and delete in and from the storage in units of areas each having the predetermined length; and output means for forming an image in units of pages on the basis of the character draw command, character set data, and delete command stored in the storage.

There is also provided a printing control method for generating print data including character data, and making a printing apparatus print an image, comprising:

the character extraction step of extracting character data from print data for one print job;

the storage step of searchably storing, in a memory, a registration number and a character image of the character data extracted in the character extraction step, and a page where the character data appears;

the character set generation step of generating character set data, which includes a registration number and character image of a character, and has a predetermined length, on the basis of the character data stored in the memory in accordance with a page to be printed; and the transmission step of generating a character draw command including a registration number of a character in units of pages to be printed, and transmitting the character draw command, character set data, and a delete command used for deleting character set data to the printing apparatus.

There is also provided a printing method for receiving a character draw command, character set data, and a delete command for the character set data from an information processing apparatus, and printing an image, comprising:

the storage step of storing, in a memory, the received character draw command, character set data, and delete command;

the management step of managing data write and delete in and from the memory in units of areas each having the predetermined length; and the output step of forming an image in units of pages on the basis of the character draw command, character set data, and delete command stored in the memory.

There is also provided a computer readable storage medium for storing a program for generating print data including character data, and making a printing apparatus print an image, the program making a computer serve as:

character extraction means for extracting character data from print data for one print job;

storage searchably storing a registration number and a character image of the character data extracted by the character extraction means, and a page where the character data appears;

character set generation means for generating character set data, which includes a registration number and character image of a character, and has a predetermined length, on the basis of the character data stored in the storage in accordance with a page to be printed; and transmission means for generating a character draw command including a registration number of a character in units of pages to be printed, and transmitting the character draw command, character set data, and a delete command used for deleting character set data to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 9 is a view showing the structure of a driver management character set;

FIG. 10 is a table showing an example of use of the driver management character set;

DETAILED DESCRIPTION OF THE PREFERRED EMBODIMENTS

First Embodiment

Figure 1:
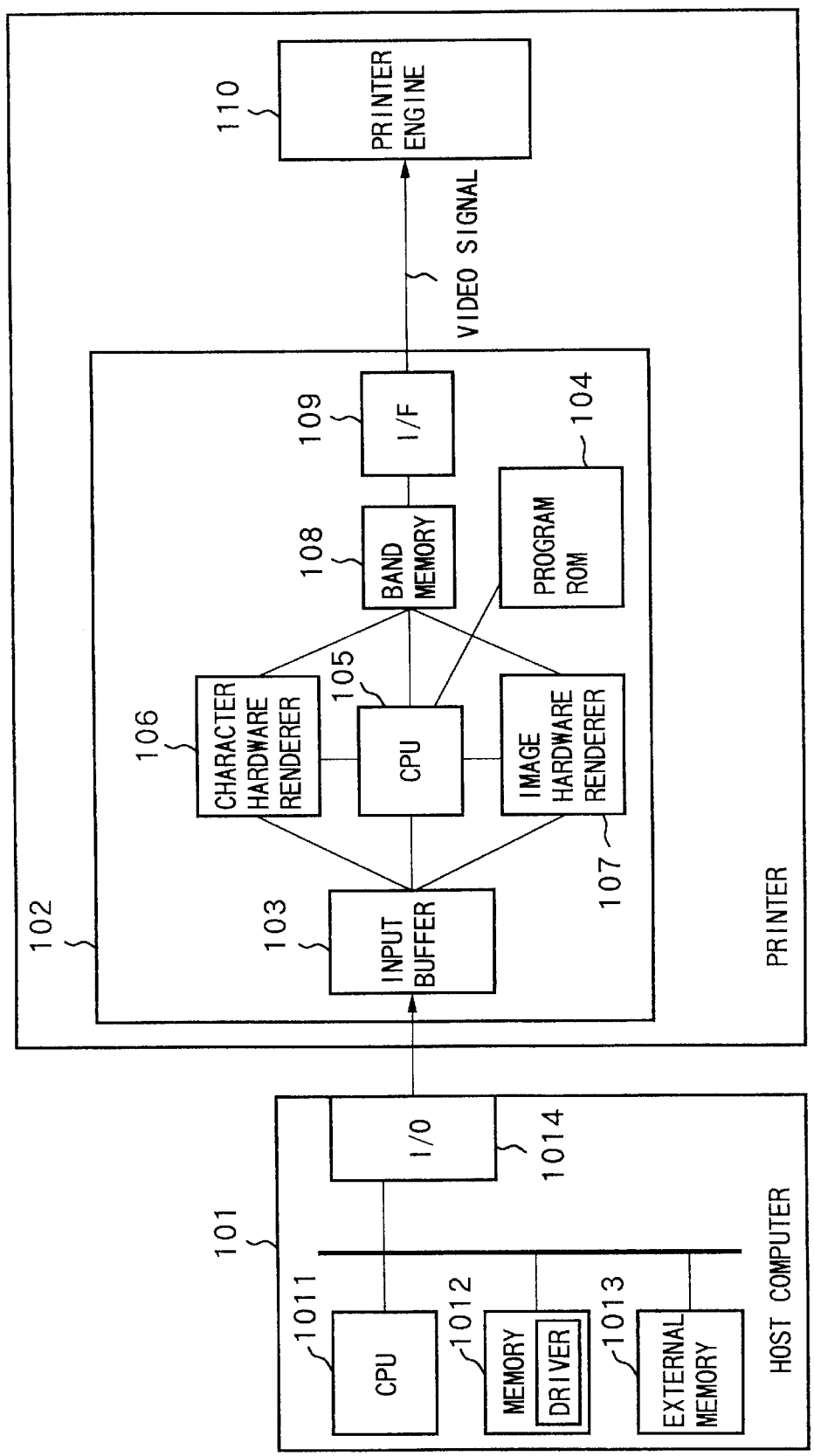
FIG. 1 is a block diagram showing the arrangement of a printing control system according to an embodiment of the present invention.

An embodiment of a printing method according to the present invention will be described below. FIG. 1 is a block diagram showing the arrangement of a printing apparatus in the embodiment.

System Arrangement

Referring to FIG. 1, reference numeral 101 denotes a host computer. The host computer 101 converts data generated by a paint application for generating an image including characters, a natural image, and the like into the data format that a printer can receive, using an image driver implemented by a CPU 1011. The host computer 101 outputs the converted data to a printer controller 102. The image driver is a program stored in an external memory 1013 or main memory 1012.

The data input to the printer controller 102 is stored in an input buffer 103 (RAM) by DMA transfer. The data stored in the input buffer 103 is processed by a transfer data interpretation program in a program ROM 104, which program is implemented by a CPU 105. The input buffer 103 is also used as an area for storing character set data. The program ROM 104 is a memory for storing the processing sequence (control program) shown in the drawings, to be described later. The CPU 105 reads data and executes various kinds of processing in accordance with the control program.

The CPU 105 sets parameters such as the drawing position of image data stored in the input buffer in an image hardware renderer 107. The image hardware renderer 107 expands the compressed image data in the input buffer, and draws it on a band memory 108.

The CPU 105 interprets a character draw command stored in the input buffer, and sets already registered character data in a character hardware renderer 106. The character hardware renderer 106 maps the character data in the input buffer as a character image, and directly draws it on an image already mapped on the band memory 108 if such image is present.

At least two band memories (page width×band height of about 128 pixels) are arranged. If one of these memories is in "shipping" (the state wherein image data is being output from the band memory to the engine unit), the other memory synthesizes images by successively executing "image mapping" (the state wherein image data other than character data is being mapped on the band memory) and character drawing (the state wherein a character image is being mapped on the band memory). The synthesized band information is immediately sent to a printer engine 110 via a printer interface 109. On the other hand, the band memory that has completed shipping proceeds to image mapping and character drawing.

The printer interface 109 is inserted between a printer engine 110 (e.g., an LBP) and the band memory 108. The printer interface 109 transmits commands to the printer engine 110 and receives status data (e.g., ready to store data) from the printer engine 110.

The CPU 105 is an arithmetic operation device for controlling the internal processing of the printer controller 102, and controls the entire printer. Reference numeral 110 denotes a printer engine for printing a video signal output from the printer controller 102. The printer engine 110 may comprise either an LBP based on electrophotography or an ink-jet printer. Also, the printer engine 110 may comprise either a color printer or monochrome printer.

Description of TypeWing Scheme

In the system with the above-mentioned arrangement, before print data is transferred from the host computer to the printer, character data are picked up in turn from the beginning of data in units of jobs. If the character corresponds to the first character data to be sent, a predetermined number of registration numbers (character IDs) and their character images are registered as a set in the printer (such set will be referred to as a character set hereinafter, and its identifier will be referred to as a character set ID hereinafter). For the second character and subsequent characters, their character IDs and drawing positions are sent from the host computer to the printer. The printer generates an image to be printed by mapping character images with reference to the registered character IDs and character images of the characters. The present inventors call this scheme a "TypeWing scheme".

The TypeWing scheme in this embodiment can be implemented by a character set register command used for registering character set data from the host computer to the printer, a character draw command in print data, and a character set delete command used for deleting the registered character set. The printer operates as follows in response to these commands.

In response to the character set register command, the printer assures a font set address table area corresponding to a character set ID, and registers character IDs and character image data included in that character set in association with each other.

In response to the registered character print (character drawing) command, the printer draws the already registered character at the designated position.

The character set delete command is used for deleting a character set which is not frequently used when, e.g., the internal memory of the printer is full of data. In response to this command, the printer deletes the designated character set from the registered character sets to release its area.

According to this TypeWing scheme, the data volume can be reduced and the transfer time from the host computer to the printer can be shortened since characters are coded. For this reason, in order to realize high-speed character printing by low-cost printers, it is effective to apply the TypeWing scheme to image printers.

Figure 2:
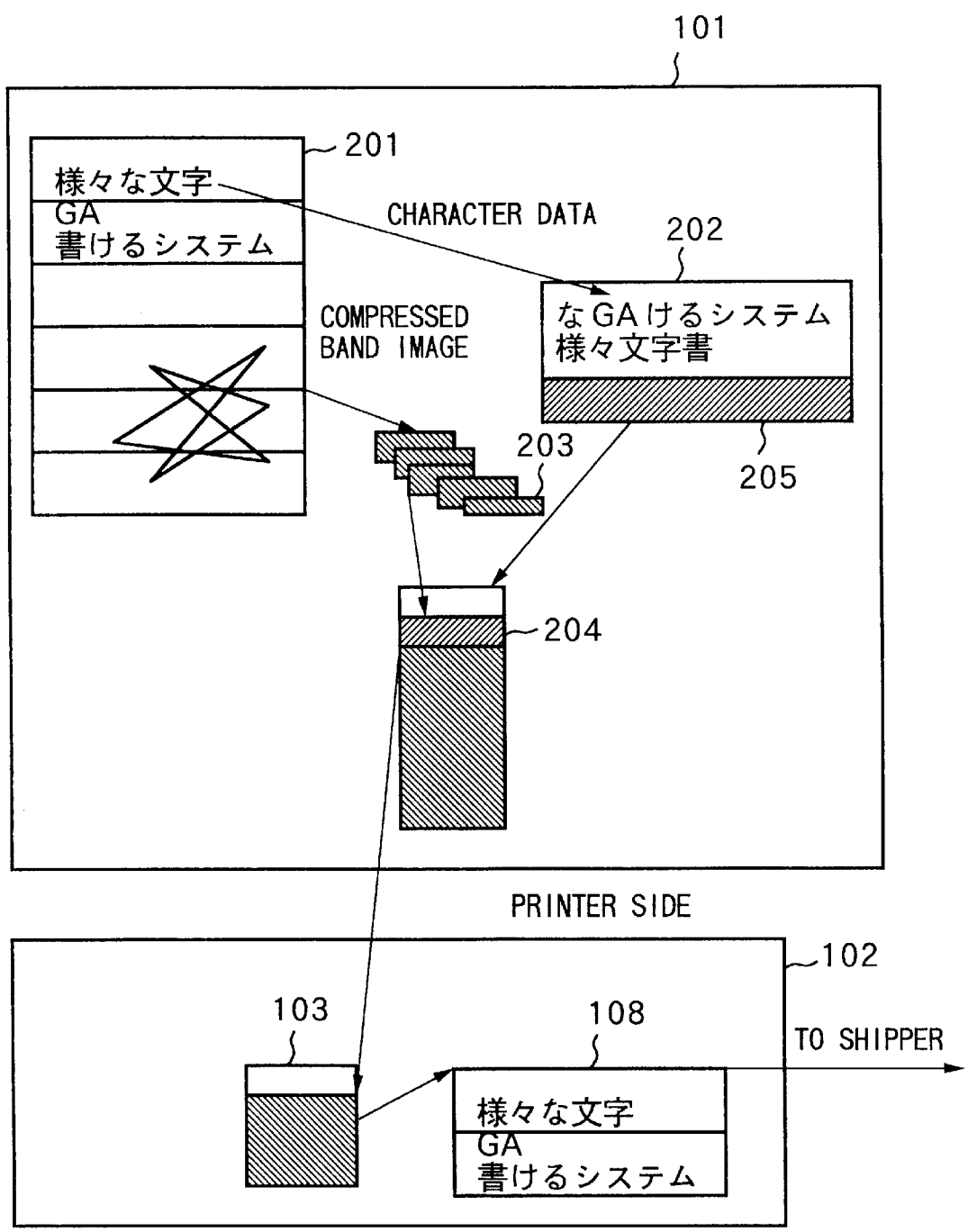
FIG. 2 is a view for explaining data generation by a driver and printing by a printer.

FIG. 2 is an explanatory view showing the processes from when the host computer generates data including both character and figure data until the printer controller outputs an image.

Reference numeral 201 denotes an illustration of the output result obtained by displaying a result generated by a paint application of the host computer 101 on a display. In the host computer 101, characters are held as character codes, and lines are held in the data format including their start and end points, line widths, and the like. A printer driver converts such data format into a data format that the printer controller 102 can output.

Processing of Printer Driver (1) Initialize Print Job

Print data in one print job are scanned to extract characters that the printer controller 102 can draw, and the extracted characters are saved in a management table in units of character types. Information of a page where a character appears is added to each character in the management table. Upon completion of saving of the characters in the management table for one print job, characters used across a plurality of pages are collected to form a character set containing bitmap font data and character identifiers.

(2) Generate Page Data

A character set required for one page is generated. The print data are scanned again to generate, for each character data, a character draw command including an identifier (ID) of a character set to which that character data belongs, a character identifier (ID) in that character set, and a drawing position of the character in a page.

The print data other than those drawn as characters are mapped as image data. The mapped image data is compressed in units of bands to form compressed image data 203 so that these data 203 can be expanded in units of sizes of the band memories 108. The generated character draw commands for one page, compressed image data, and character set data required for that page will be referred to as page data hereinafter.

(3) Data Transfer

After the page data for one page has been prepared in the internal memory space of the host computer 101, the computer 101 sends a character set register command and character draw commands to the printer controller 102, and transfers the image data to the printer as long as the memory space of the printer controller 102 allows.

Upon receiving, from the printer controller 102, information indicating sufficient memory space, the host computer 101 sends the subsequent image data corresponding to the memory space.

(4) Delete Unnecessary Data

Upon completion of transfer of the page data for one page, the host computer 101 generates a delete command of a character set made up of characters used in that page alone and transfers it to the printer.

Note that the host computer transfers commands and data to the printer in turn irrespective of completion/non-completion of output from the printer. The printer manages the character sets in accordance with its printing state and the commands from the host computer. For example, after output of a certain page is complete, the printer processes the character set delete command of that page to maintain data consistency. In this way, the processing of this embodiment can be performed without connecting the printer and host computer via two-way communications.

Figure 3:
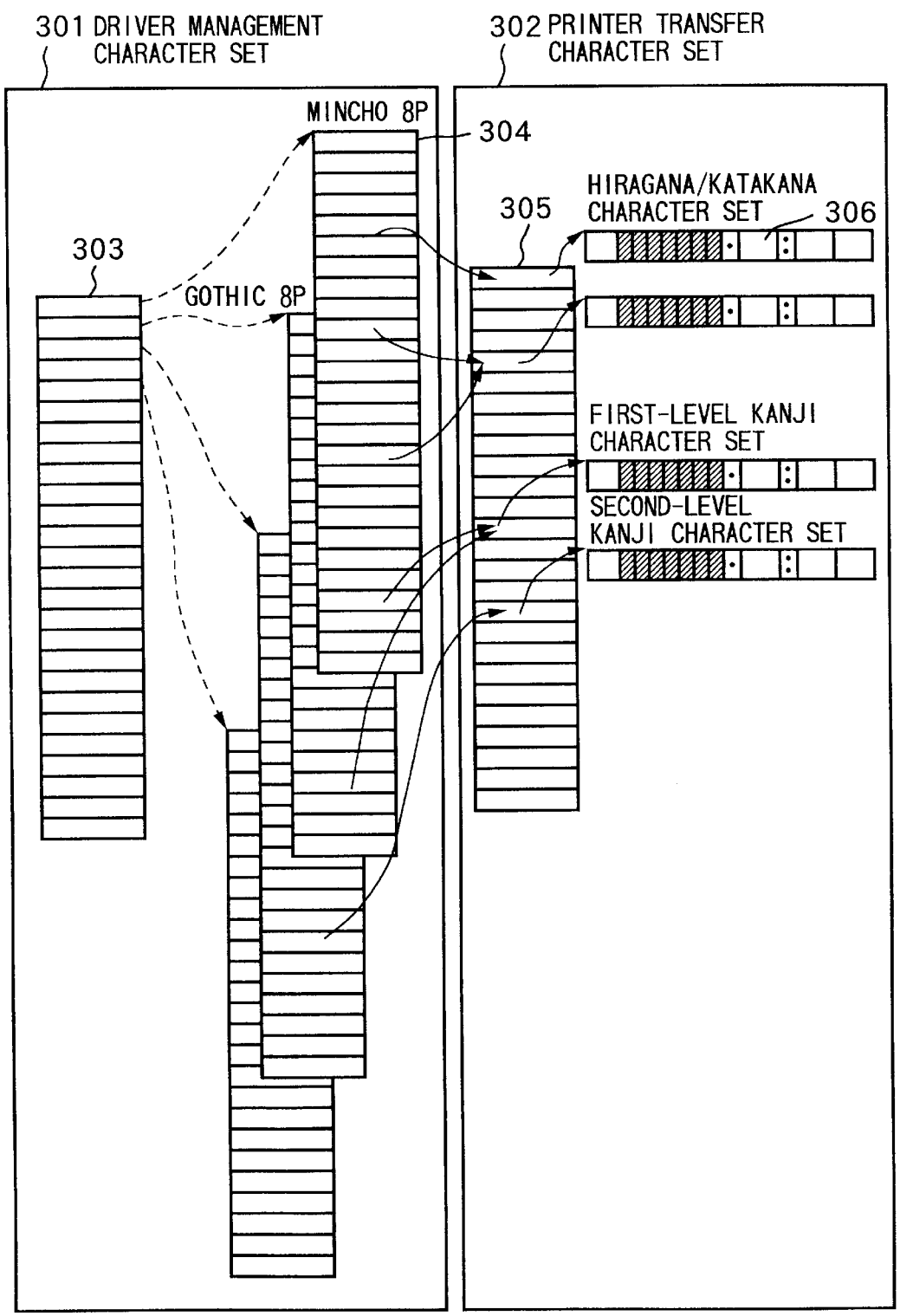
FIG. 3 is a view for explaining the management data structure of character sets on the driver side.

FIG. 3 shows various tables prepared for managing character sets by the host computer 101.

In FIG. 3, a driver management character table group 301 is prepared in units of print jobs, and includes a character set table 303 and character management tables 304.

Driver Management Character Set

A driver management character set 301 is held in the host computer during the corresponding print job so that the printer driver manages character sets of the printer.

A character set table 303 registers character sets in units of character types (points, typeface, e.g. mincho and gothic, and the like). The printer driver checks characters included in the data to be printed in one job, and registers their character types in the driver management character set table 303. The character types are registered by setting pointers to the driver management character management table 304 corresponding to these character types in a pointer area of the driver management character set table 303.

The driver management character management table 304 is formed in units of character types. The structure of the character management table 304 will be described below with reference to FIG. 9.

Each of characters included in page data is assigned a character ID 901 unique to that character in addition to a character code used in the host computer. The assigned character ID 901 is registered so as to be retrieved from its character code by a method that allows high-speed search, e.g., by hashing.

When the character ID 901 is registered for the first time, the page number of a page where the corresponding character appears is set in minPage 902 and maxpage 903. Character data mapped in the bitmap format is stored in a character data storage area, and its start address is set in a character pointer 904.

When an identical character appears a plurality of number of times in a single job, the corresponding character ID in the driver management character management table 304 is found out, and its maxPage 903 is updated by the page number of a page where that character appears last.

After the characters for one job have been registered, grouping for forming printer transfer character sets is done with reference to the page numbers of pages where the characters registered in the driver management character management table 304 appear. Upon forming the printer transfer character sets, of characters used across a plurality of pages, those used in common page ranges are grouped. With this grouping, bitmap data for an identical character is possibly prevented from being repetitively transferred in one job.

After the groups are determined, character sets required for the first page are grouped. Upon determination of the group of character sets required for the first page, a printer transfer character set is formed, and is registered in a printer transfer character set management table 305.

In this manner, character sets are grouped according to the following three rules.

(1) All characters required for drawing an image for a page must be transferred to the printer.

(2) An unnecessary character set is deleted by a character set delete command so as to prevent the data storage memory in the printer from overflowing.

(3) Characters used in a common page range are registered in a single character set to reduce the number of times of re-transfer.

The ID of a character set in which a character is stored, and an offset value (relative address) in the character set are respectively registered in CharSetID 905 and Offset906 in the character management table 304.

Note that the character IDs of characters such as alphabet, hiragana characters, numerals, and the like that appear frequently are preserved, and are preferentially registered at such preserved ID positions in the character management table 304. In this fashion, overheads of calculation of a hash function, collision processing, and the like can be prevented.

Grouping of Characters and Example of Formed Printer Transfer Character Set

FIG. 10 shows an example of a driver management character set formed in this manner. As can be seen from FIG. 10, for example, character 1, i.e., a character with a character ID="1", and character 7, i.e., a character with a character ID="7" are used within the range from the first page to the fifth page, and character 8, i.e., a character with a character ID="8" is used in the fifth page alone. Hence, characters 1 and 7 are classified into one group since they are used in the same page range. Other characters are classified into separate groups since they are used in different page ranges.

When a transfer character set is formed using these groups, it is often efficient to combine a plurality of groups into a single character set depending on the length of the character set, since the printer transfer character set has a fixed length. The groups are to be combined when they satisfy the following two conditions.

(1) The length of a printer transfer character set formed by combining some groups is smaller than the fixed length.

(2) The page ranges of the groups are continuous or partially overlap each other.

In FIG. 10, since the use range of, e.g., characters 1 and 7 includes those of all other characters, the group of these characters can be combined with any other groups as long as the character set length allows. Also, since the use range of character 4 overlaps those of all other characters or is continuous with them, it can be combined with any other group as long as the character set length allows. However, characters 2 and 8 cannot be combined since they do not satisfy the conditions.

Although the above description is merely an example, the characters are grouped in like manner, and transfer character sets are formed based on the groups.

Printer Transfer Character Set

A printer transfer character set 302 is data for forming a character set register command to be sent to the printer. Character data registered in the driver management character set 301 are also registered in the printer transfer character set 302.

The printer transfer character set 302 includes a character set management table 305 and character set data 306. Each character set data 306 is the character set data itself to be transferred from the driver to the printer, and has a format to be described later.

Bitmap data as a body of character data is obtained by, e.g., mapping from an outline font possessed by the host computer. Each character set data 306 is deleted by character set delete processing. For this reason, since bitmap data is also registered in the driver management character management table 304 in units of characters, a character set can be registered again without re-mapping bitmap data upon, e.g., a paper jam after the character set delete processing, and high-speed processing can be attained.

Transfer Data From Host Computer to Printer

The transfer data format will be explained below with reference to FIG. 4.

Figure 4:
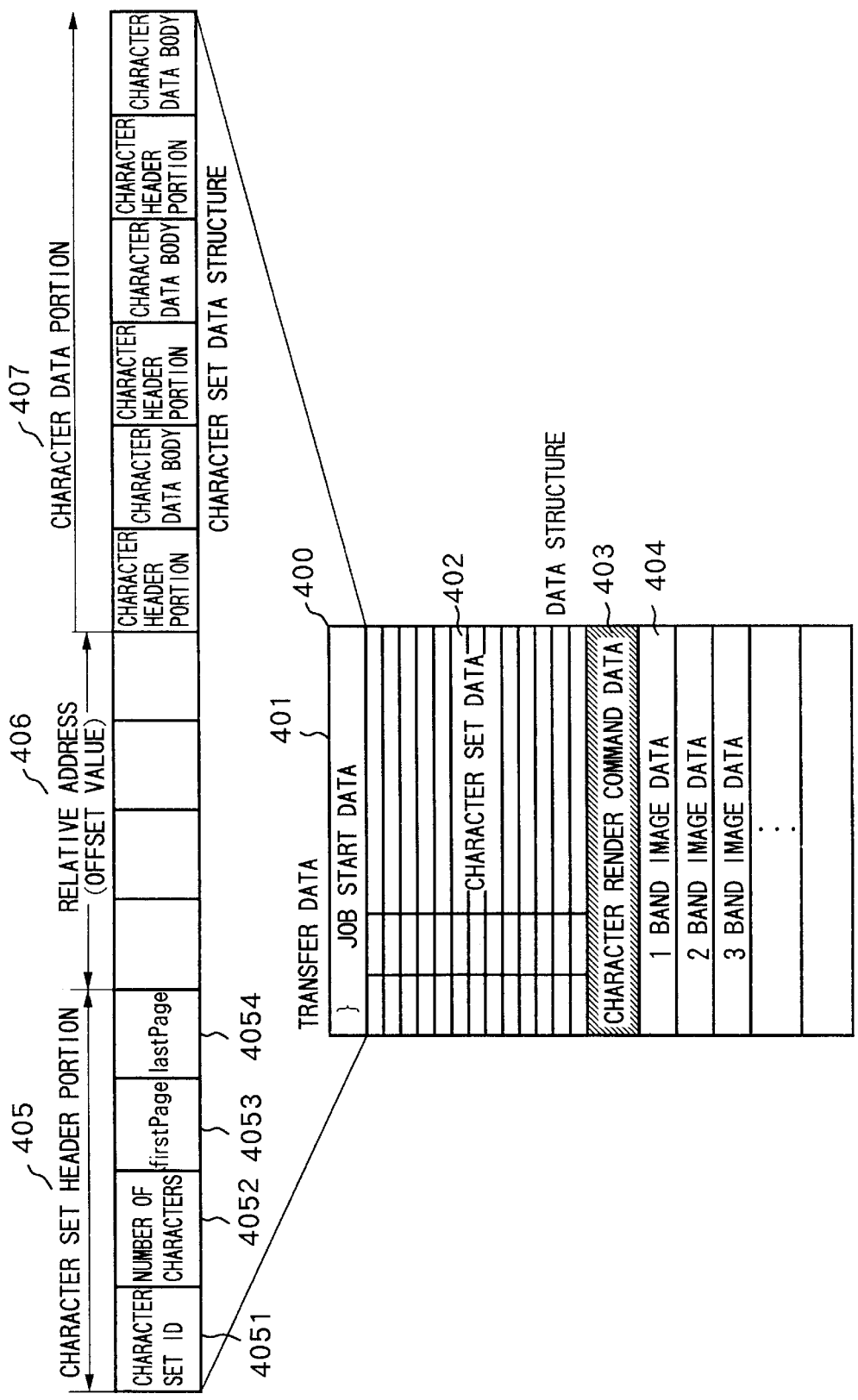
FIG. 4 is an explanatory view of the detailed structure of a transfer character set.

FIG. 4 shows the page data structure for one page formed by the host computer.

Job Start Data Portion

Job start data 401 is a table that registers information of various data to be transferred, and includes initialization data such as page layout information data required for drawing.

Character Set Data Portion

Character set data 402 is configured so that bitmap font data of characters used in drawing that page can be easily found out from their character IDs.

The size of one character set is a multiple of a fixed length determined for each printer, and the number of registered characters changes depending on the font sizes and compression ratio. When the size of one character set is smaller than the fixed length size, it is adjusted to the fixed length size by bit stuffing. The character set data includes a character set header portion 405, relative address 406, and character data portion 407.

The character set data portion 405 includes a character set ID 4051, the number 4052 of characters registered in that character set, firstpage 4053 indicating the first page where that character set is used, and lastPage 4054 indicating the last page.

The relative address portion 406 is set with byte offset values from the header portion, which values are used for accessing individual character data in the character set data, in correspondence with the number of registered characters.

In the character data portion 407, character data are actually registered, and compressed bitmap data of each character is registered after its character header portion storing information such as the width, height, compression type, size, and the like of that character.

Character Draw Command Data Portion

Character draw command data 403 is a group of commands for designating the drawing positions of characters. The character draw command data are grouped in units of bands, and each data is indicated by the ID of a character set that includes the character to be printed, and the offset value of that character in the character set. As a drawing position, a relative coordinate position in the band is set.

Also, the data size of all the character draw command data is adjusted to become a multiple of the fixed length size.

Image Data Portion

An image data portion 404 corresponds to compressed image data which is generated based on the height and width of each band as a processing unit of the printer.

Character Set Management and Character Draw Command Generation Sequence

Figure 8:
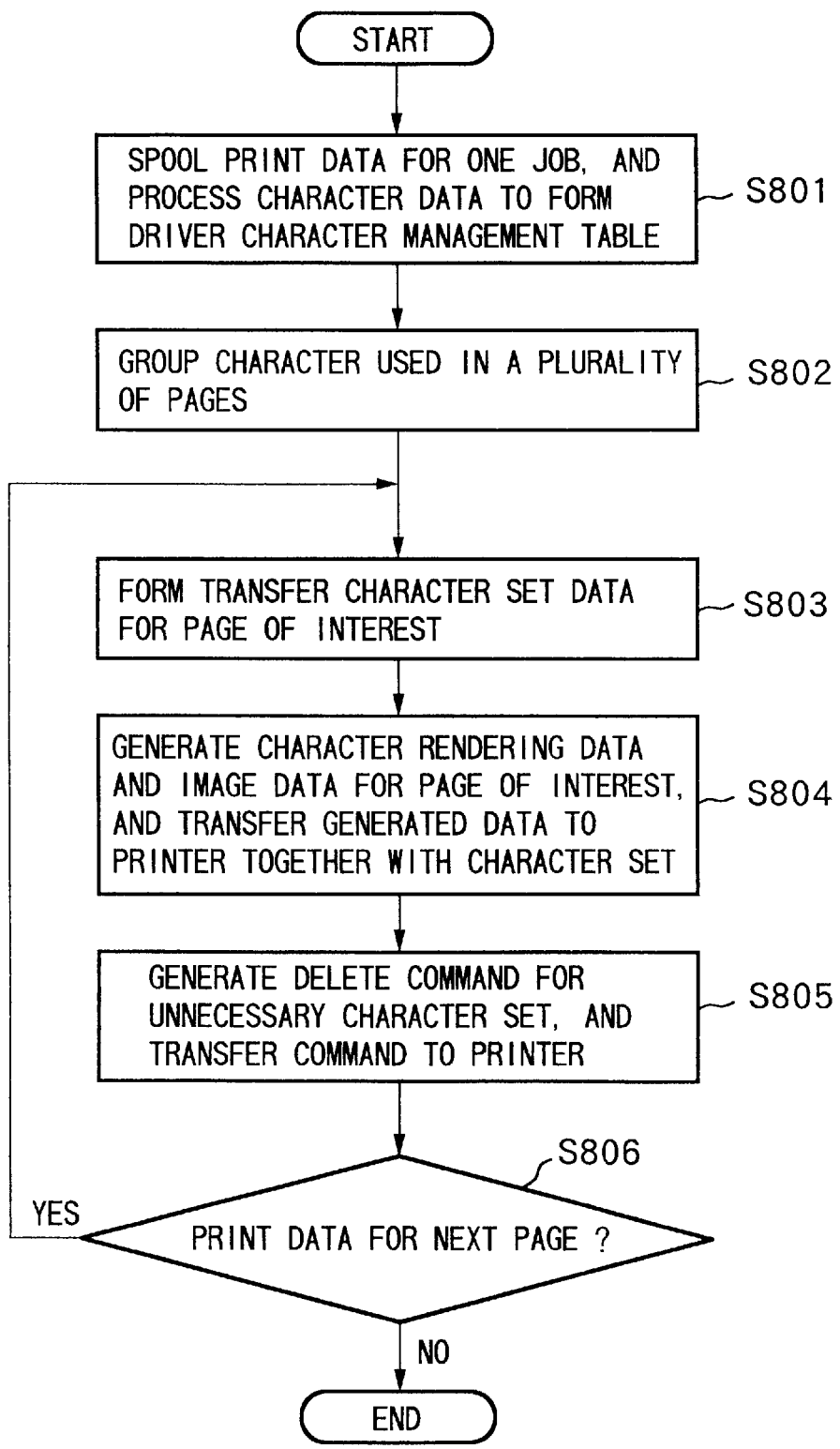
FIG. 8 is a flow chart showing the character processing in a host computer.

The generation sequence of character set data and character draw commands by the printer driver of the host computer will be described below with reference to the flow chart of FIG. 8 and the data structures shown in FIGS. 3, 4, and 9.

S801: Print data for one job are spooled. Of these data, only character data are processed to form a driver management character set 301. In this case, the page numbers of pages where characters appear are managed using minPage 902 and maxpage 903 in the character management table 304.

S802: Characters used in a plurality of pages are found out from the driver management character set using minPage 902 and maxpage 903 indicating the page numbers so as to group the characters used in a plurality of pages.

S803: Characters used in the page of interest, which is currently being processed, are grouped on the basis of minPage 902 and maxpage 903 indicating the page number of the page where characters appear. Transfer character sets 302 of characters used in the page of interest are formed based on this group and the character groups formed in step S802. In this case, characters that belong to different groups are registered in different character sets.

S804: Character draw commands for the page of interest are generated, and are transferred to the printer together with the character sets formed in step S803. Each character draw command is generated by combining a character set ID 905 and a relative address 906 in that character set. Other data are mapped as images to generate image draw commands, which are transferred to the printer.

S805: A delete command for deleting a character set which becomes unnecessary after the page of interest is generated, and is transferred to the printer. The character set to be deleted is normally the one that includes characters grouped in step S803, and the character sets grouped in step S802 do not become the objects to be deleted since they are also used after the page of interest.

S806: If the current job includes the next page, that page is set as the page of interest, and the flow returns to step S803; if there is no next page, the processing ends.

With the above-mentioned sequence, printer transfer character sets are formed, and are transmitted to the printer together with the character draw commands.

Data Format in Printer

Figure 5:
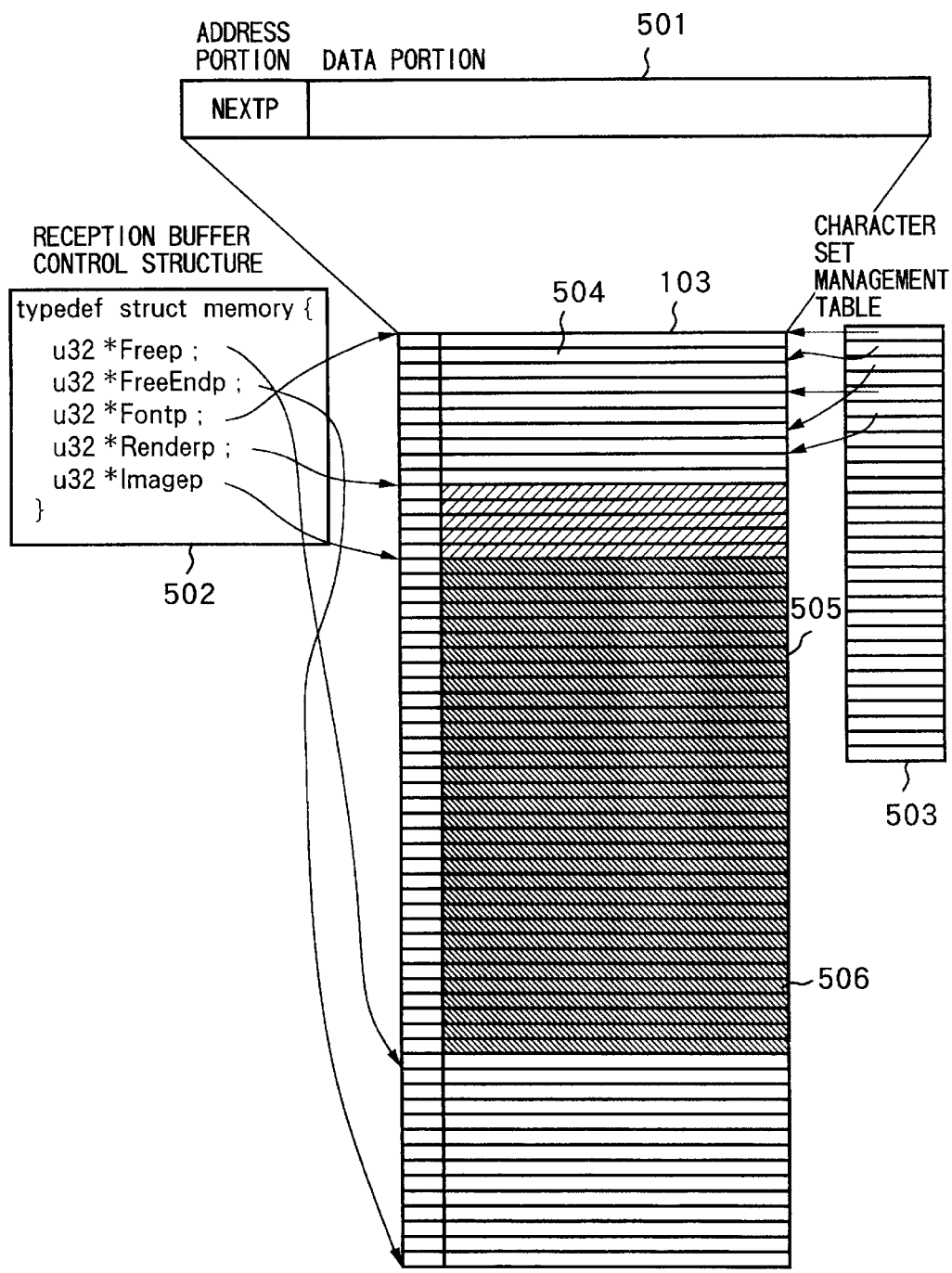
FIG. 5 is a view showing the structure and storage format (first page) of a reception buffer of the printer.
Figure 11:
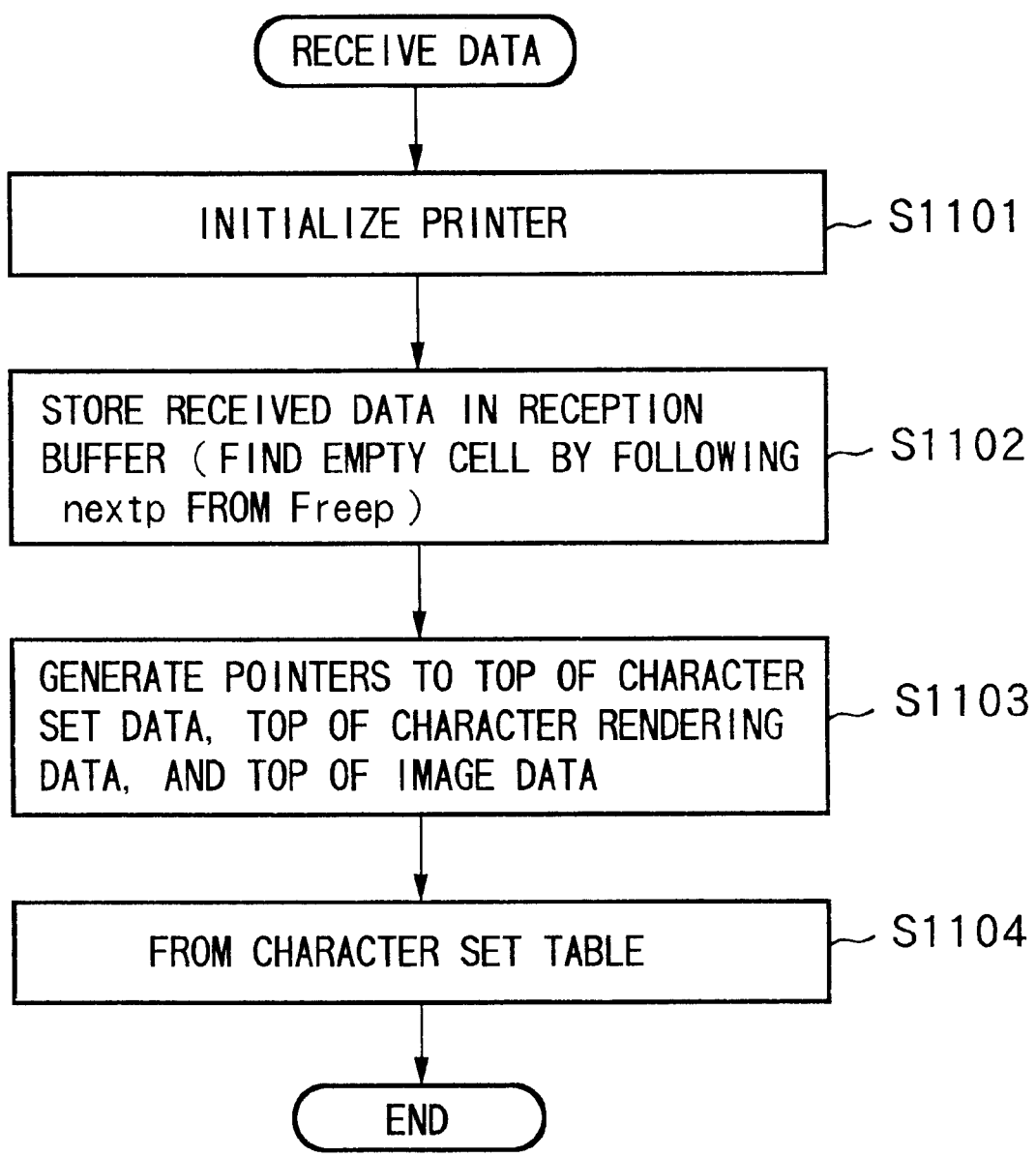
FIG. 11 is a flow chart showing the sequence for receiving print data in the printer.

The data storage sequence on the RAM in the printer and the data format of the data to be registered will be explained below with the aid of FIGS. 5 and 11.

S1101: The printer controller 102 reads job start data in transfer data 400 generated by the driver, and initializes the printer.

S1102: After that, data are loaded on the RAM in accordance with the data size included in a job start command.

The reception buffer 103 is made up of many reception cells each having a fixed length. Each reception cell 501 has a structure including an address portion (nextp) serving as a pointer to the next empty buffer, and a data portion. The size of one character set data formed by the host computer matches the size of this reception cell. Even if they do not match each other, data may be managed. However, since the printer manages in units of reception cells irrespective of whether or not areas are in use, even data with odd size occupy one reception cell, and the memory cannot be efficiently used.

The reception buffer 103 is managed by a reception buffer control structure 502. The reception buffer control structure 502 is made up of a pointer Freep to an empty reception cell, a pointer FreeEndp to the last one of empty reception cells, a pointer Renderp to the top of the character draw command data portion, and a pointer Imagep to the top of the image data portion. In the initial state, the pointer Freep points to the first cell of the reception buffer, the pointer FreeEndp points to the end reception cell of the reception buffer, and the address portion of each reception cell is written with a pointer to the next reception cell.

Data received from the host computer is stored at the address pointed by the pointer Freep in units of reception buffer cells. The pointer Freep is updated by the value of the pointer nextp of the reception cell where the data is stored. The data can be read until the pointer Freep assumes the same value as that of the pointer FreeEndp.

S1103: From the data size in the initially read job start command, the top position (Fontp) of character set data, the top position (Renderp) of the character draw command data, and the top position (Imagep) of image data can be calculated, and the calculated positions are registered in the reception buffer control structure 502.

Note that image data for one page often cannot be stored, and in such case, data are stored as long as the memory space allows.

S1104: Following the pointer fontp, a character set table 503 that stores character set IDs and pointers to the corresponding character sets in units of character sets is formed.

Printing Sequence

Figure 6:
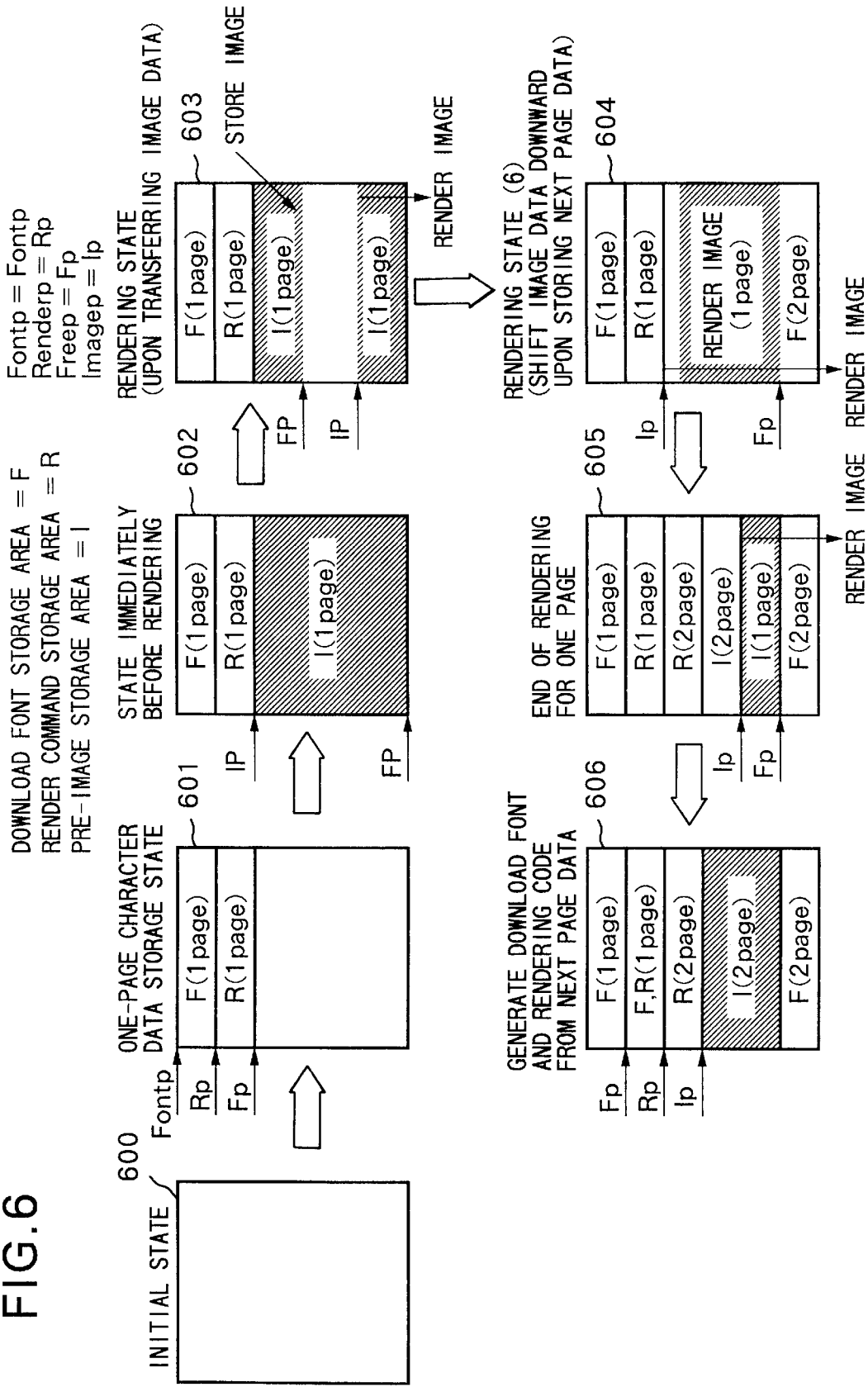
FIG. 6 is a view showing the memory management method of the printer.

The processing from when a plurality of pages are received on the above-mentioned memory space until the received data are printed out will be explained below with reference to FIG. 6.

600: At the beginning of drawing, the reception buffer is in the initial state.

601: The received character set data and character drawing data are stored from the top of the reception buffer in accordance with nextp.

602: Image data are stored until the memory is full of data, and the pointers Fontp, Renderp, and Imagep are set on the basis of the data sizes included in the job start command.

Also, the start addresses of the stored character sets are stored in the character set table in units of sets. These processes correspond to the sequence show in FIG. 11.

603: Drawing is started. Band image data pointed by the pointer Imagep is mapped on the band memory. The CPU interprets the character draw command data pointed by the pointer Renderp, acquires the corresponding character images from the character set data, and draws characters on the mapped image.

As the drawing progresses, each reception cell in the image data portion that has been mapped on the band memory is released. The address of the released reception cell is set in the pointer nextp of the reception cell pointed so far by the pointer FreeEndp, and after that, the address of the released cell is also set in FreeEndp.

In the released reception cell, data placed in a queue for storage in the reception buffer is written in turn.

604: After all the data for one page are stored in the reception cells, data for the next page are also stored. In state 604, character set data for the second page is stored in an empty area after the image data for the first page.

605: The state immediately before processing for all the data for one page is complete is illustrated. In this state, the character set data, character draw command data, and some image data for the first page are stored. Also, character set data, character draw command data, and some image data for the second page are stored.

606: A delete command of character set data is sent from the host computer as needed. Upon completion of the processing of character draw commands for the page of interest, reception cells which store character set data that becomes unnecessary, and the draw commands for the first page, are released. After that, the job start command for the second page is read to set parameters.

When the character set data is deleted, the start address of the released reception cell is set in the pointer nextp of the reception cell pointed by the pointer FreeEndp, and its end address is set in FreeEndp.

Delete Command Processing Sequence

Figure 12:
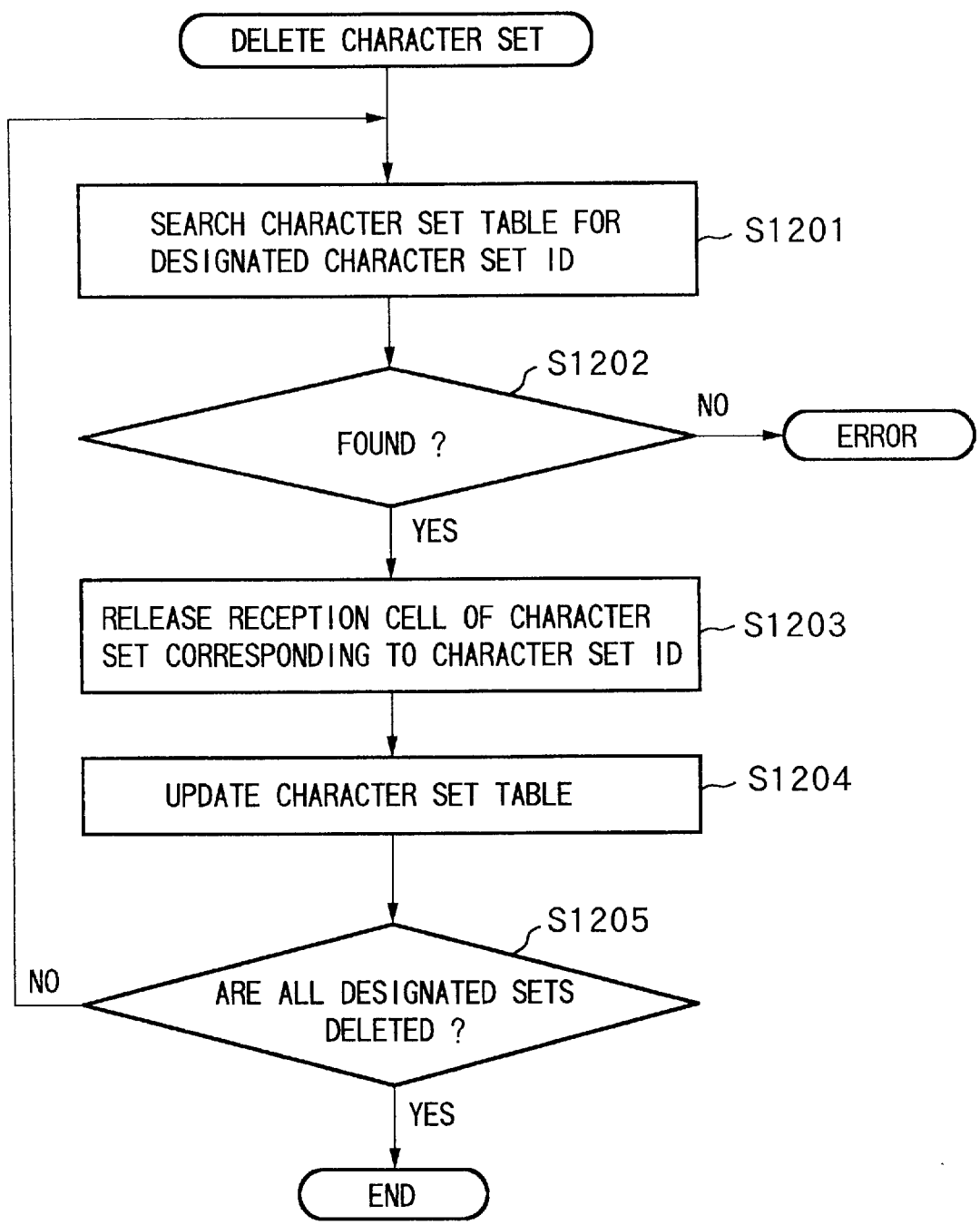
FIG. 12 is a flow chart showing the sequence for deleting character set data in the printer.

The processing sequence for the character set delete command will be explained below with reference to FIG. 12.

S1201: The character set table 503 held by the printer is searched for the character set ID designated as the object to be deleted.

S1202: If such ID is not found, error processing is executed.

S1203: The address of the reception cell of the character set corresponding to the designated character set ID is acquired from the character set table, and that reception cell is released. The reception cell is released by connecting the current empty area and a new area to be released by the pointers nextp of the respective reception cells. That is, the address of the reception cell to be released is set in the pointer nextp of the reception cell pointed by the pointer FreeEndp to the end of the current empty area, and the address of the reception cell to be released is then set in the pointer FreeEndp.

S1204: The entry in the character set table corresponding to the deleted character set ID is deleted to update the table.

Since the character set data is deleted in this way, an empty area is released in units of reception cells. For this reason, the memory can be re-used without collecting released areas. Note that the reception cell release sequence is used not only for the character set data but also for releasing reception cells that store character draw command data after output for one page, and band image data after output for one band.

Figure 7:
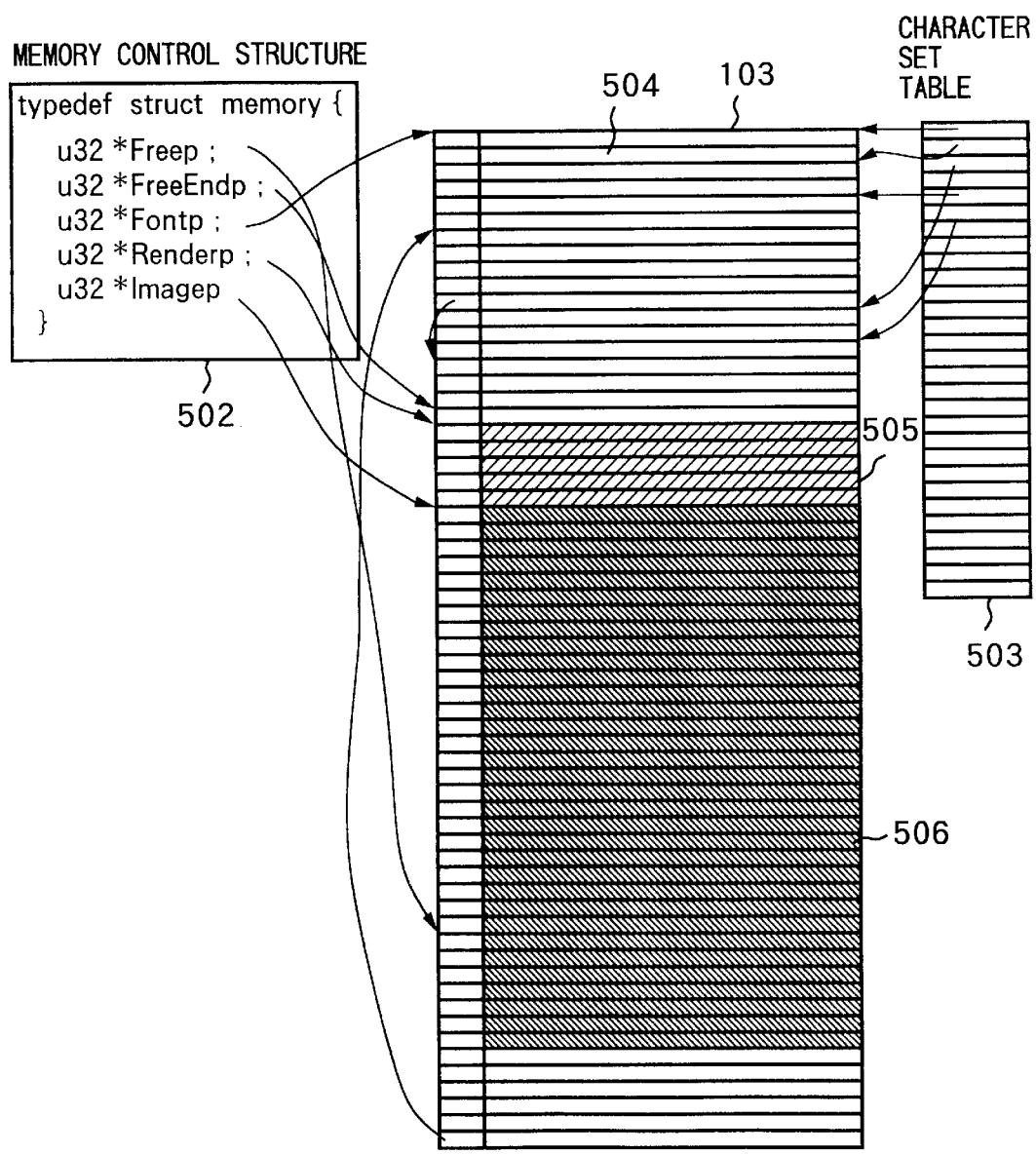
FIG. 7 is a view showing the structure and storage format (output of a plurality of pages that are in progress) of the reception buffer of the printer.

FIG. 7 shows the state after drawing has progressed. An empty area is formed from the reception cell pointed by the pointer Freep to that obtained by following nextp. When nextp points to continuous reception cells, the arrows representing such nextp are not shown.

As described above, when the character set size is a non-fixed length and data occupy the memory discontinuously, the size of an empty area formed after the character set data is deleted is not always the same, and discontinuous empty areas are formed if character sets registered in units of characters are deleted. When character set data are re-created to obtain sufficient empty memory space, such processing requires much time, and it is impossible to re-create character set data among pages upon outputting continuous pages.

By contrast, in the printing system according to this embodiment, the memory of the printer is managed in units of reception cells each having a fixed length. For this reason, an empty area is released in units of reception cells in the memory of the printer, and can be immediately re-used without collecting an empty area.

In such case, if character set data are formed in units of characters, since character set data for one character must be stored in one reception cell, a large area is wasted. In this embodiment, however, since the host computer forms character set data on the basis of a fixed length corresponding to each reception cell size, the character set data can be efficiently stored in the reception cell without dropping the use efficiency of the memory.

The printing system in which the printer determines the execution timing of a delete command of character set data, and executes a character set delete command has been described. If the host computer and printer are connected via a two-way interface, and the host computer can obtain information from the printer, the printer may inform the host computer of the end of printout for one page, and the host computer may transmit a delete command of a character set which is not used in the subsequent pages to the printer on the basis of that information.

Printer Engine

The printer engine of the above embodiment is not particularly limited. Two typical engines that can be used in the printer of this embodiment will be explained below.

Figure 13:
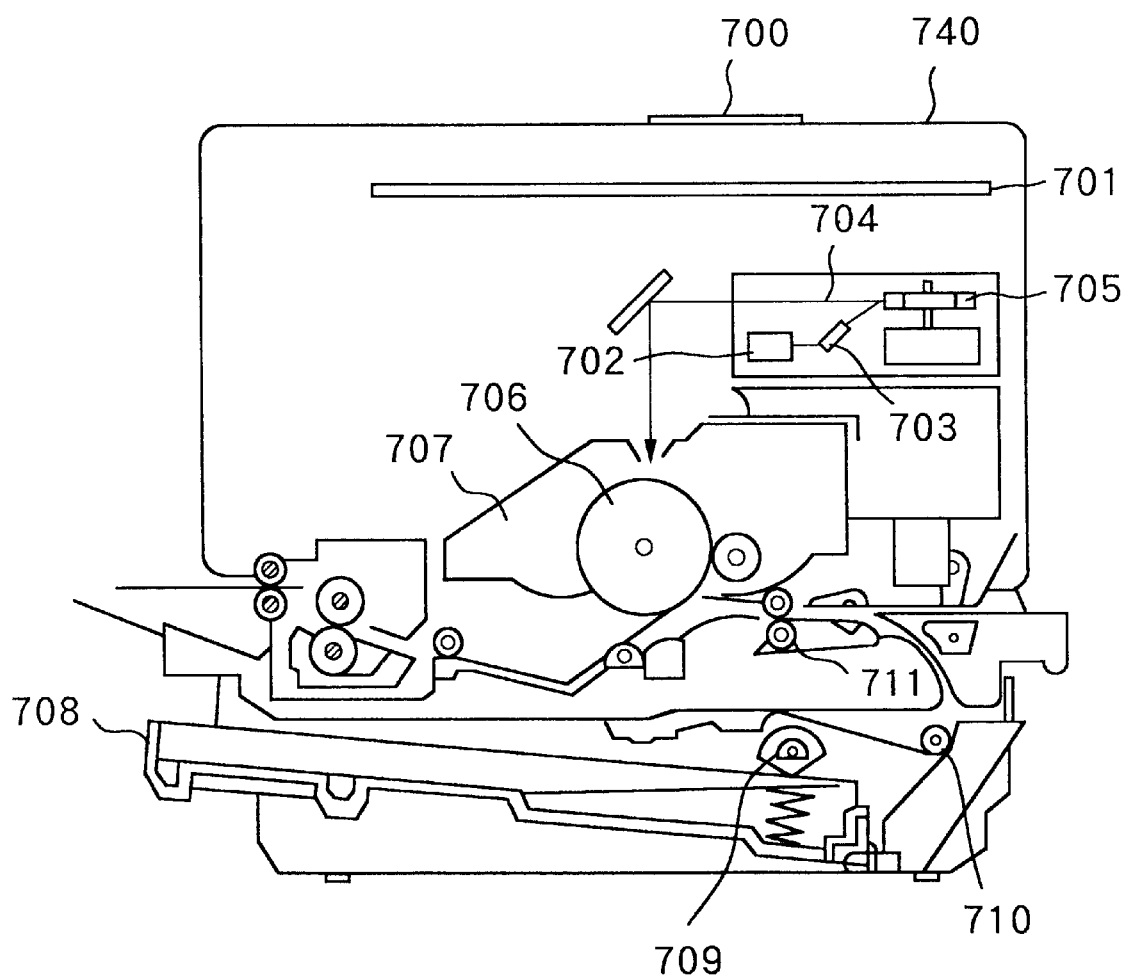
FIG. 13 is a sectional view showing the engine of a laser beam printer.

FIG. 13 is a sectional view showing the internal structure of a laser beam printer (to be abbreviated as an LBP hereinafter) in this case. This LBP can receive character pattern data and the like and can print them on a printing paper sheet.

In FIG. 13, reference numeral 740 denotes an LBP main body, which forms an image on a printing paper sheet as a printing medium on the basis of received character patterns and the like. Reference numeral 700 denotes a control panel on which switches, LED display, and the like for operations are disposed; and 701, a printer control unit for controlling the overall LBP 740 and interpreting character pattern information and the like. The printer control unit 701 mainly converts character pattern information into a video signal, and outputs the video signal to a laser driver 702.

The laser driver 702 is a circuit for driving a semiconductor laser 703, and ON/OFF-controls a laser beam 704 emitted by the semiconductor laser 703 in accordance with the input video signal. The laser beam 704 scans the surface of an electrostatic drum 706 while being horizontally deflected by a rotary polygonal mirror 705. Upon scanning, an electrostatic latent image of each character pattern is formed on the electrostatic drum 706. The latent image is developed by a developing unit 707 arranged around the electrostatic drum 706, and the developed image is transferred onto a printing paper sheet. Cut sheets are used as the printing paper sheet. The cut sheets are stored in a paper cassette 708 loaded into the LBP 740 and are picked up one by one into the printer by a pickup roller 709 and convey rollers 710 and 711, and the picked-up sheet is supplied to the electrostatic drum 706.

Figure 14:
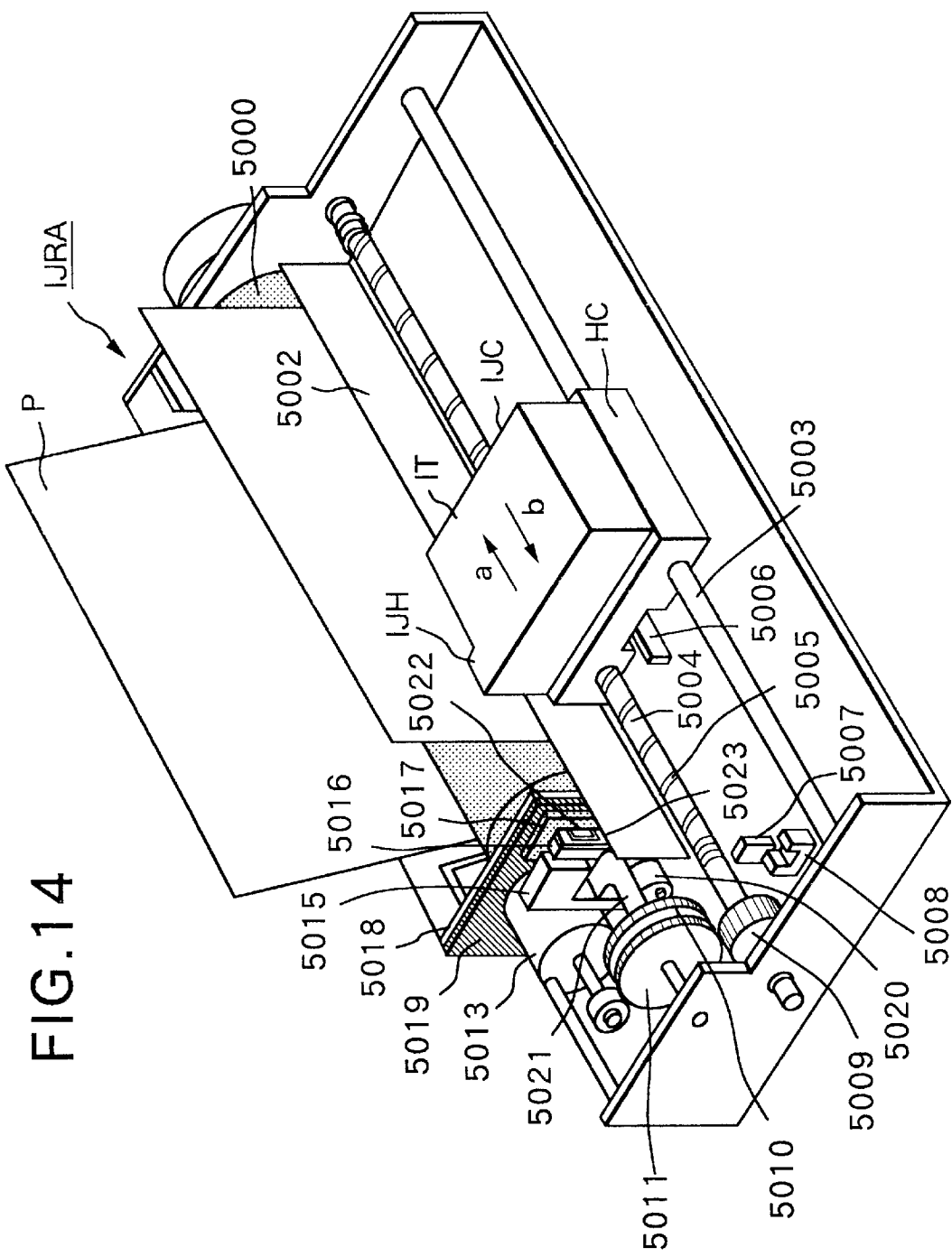
FIG. 14 is a perspective view showing the engine of an ink-jet printer.

FIG. 14 is a perspective view of an ink-jet printing apparatus IJRA to which the present invention can be applied. Referring to FIG. 14, a carriage HC engages with a spiral groove 5004 of a lead screw 5005, which rotates via driving force transmission gears 5011 and 5009 in accordance with the forward/reverse rotation of a driving motor 5013, and is reciprocally movable in the direction of an arrow a or b via a pin (not shown). An ink-jet cartridge IJC is mounted on the carriage HC. Reference numeral 5002 denotes a paper press plate which presses a paper sheet against a platen 5000 along the carriage moving direction. Reference numerals 5007 and 5008 denote photocouplers that build a home position detection means for confirming the presence of a lever 5006 of the carriage in the region of the photocouplers and performing switching of the rotation direction of the driving motor 5013, and the like. Reference numeral 5016 denotes a support member for supporting a cap member 5022 that caps the front surface of a print head; and 5015, a suction means for drawing the interior of the cap member by suction to attain suction recovery of the print head via an intra-cap opening 5023. Reference numeral 5017 denotes a cleaning blade; and 5019, a moving member which allows that blade to be movable in the back-and-forth direction in FIG. 14. The cleaning blade 5017 and the moving member 5019 are supported by a main body support plate 5018. The blade is not limited to the illustrated one, but a known cleaning blade may be applied to this embodiment. Reference numeral 5021 denotes a lever which is used for initiating the suction process of the suction recovery, and moves upon movement of a cam 5020 which engages with the carriage. The movement control of the lever is done by a known transmission means such as clutch switching or the like using the driving force from the driving motor.

Another Embodiment

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, the character mapping time on the host computer and the transfer data amount from the host computer can be minimized by receiving a character portion as a character code and mapping it as a character image, and the memory capacity of the printing apparatus can be reduced and can be efficiently used.

As many apparently widely different embodiments of the present invention can be made without departing from the spirit and scope thereof, it is to be understood that the invention is not limited to the specific embodiments thereof except as defined in the appended claims.

What is claimed is:

1. A character processing apparatus comprising:

character grouping means for forming a separate group including a character which appears only in a page of interest from a group including a character which appears in plural pages;

registration command transmission means for transmitting a registration command which instructs a target device to register the grouped character; and deletion command transmission means for transmitting a deletion command which instructs the target device to delete the grouped character registered in response to the registration command.

2. The apparatus according to claim 1, wherein said grouping means forms a group including characters which appear in a same range of pages.

3. The apparatus according to claim 1, further comprising character transmission means for transmitting character rendering data corresponding to the grouped character transmitted by said registration command transmission means so that the target device can print the character using the character rendering data.

4. The apparatus according to claim 3, wherein said deletion command transmission means transmits the deletion command which instructs the target device to delete the grouped character which appears only in a page before the page of interest while said character transmission means transmits character rendering data corresponding to the grouped character included in the group appears in the page of interest.

5. A character processing apparatus comprising:

character grouping means for forming a separate group including a character which appears only in a page of interest from a group including a character which appears in plural pages;

registration means for registering the grouped character; and deletion means for deleting the grouped character registered by said registration means.

6. The apparatus according to claim 5, wherein said grouping means forms a group including characters which appear in a same range of pages.

7. The apparatus according to claim 5, wherein further comprising character registration means for registering character rendering data corresponding to the grouped character registered by said registration means so as to print the character using the character rendering data.

8. The apparatus according to claim 7, wherein said deletion means deletes the group including a character which appears only in a page before the page of interest while said character registration means registers character rendering data corresponding to the grouped character included in the group appears in the page of interest.

9. A character processing method comprising the steps of:

forming separate group including a character which appears only in a page of interest from a group including a character which appears in plural pages;

transmitting a registration command which instructs a target device to register the grouped character; and transmitting a deletion command which instructs the target device to delete the grouped character registered in response to the registration command.

10. The method according to claim 9, wherein said forming step forms a group including characters which appear in a same range of pages.

11. The method according to claim 9, further comprising a character transmission step of transmitting character rendering data corresponding to the grouped character transmitted by said registration command transmission step so that the target device can print the character using the character rendering data.

12. The method according to claim 11, wherein said first transmitting step transmits the deletion command which instructs the target device to delete the grouped character which appears only in a page before the page of interest while said character transmission step transmits character rendering data corresponding to the grouped character included in the group appears in the page of interest.

13. A character processing method comprising the steps of:

forming a separate group including a character which appears only in a page of interest from a group including a character which appears in plural pages;

registering the grouped character; and deleting the grouped character registered in said registering step.

14. The method according to claim 13, wherein said forming step forms a group including characters which appear in a same range of pages.

15. The method according to claim 13, further comprising a step of transmitting character rendering data corresponding to the grouped character registered by said registering step so that the target device can print the character using the character rendering data.

16. The method according to claim 15, wherein said deleting step deletes the grouped character which appears only in a page before the page of interest while said registering step registers character rendering data corresponding to the grouped character included in the group appears in the page of interest.

17. A computer readable medium having a computer program comprising computer program code means for making a computer execute the steps of:

forming a separate group including a character which appears only in a page of interest from a group including a character which appears in plural pages;

transmitting a registration command which instructs a target device to register the grouped character; and transmitting a deletion command which instructs the target device to delete the grouped character registered in response to the registration command.

18. The medium according to claim 17, wherein a group including characters which appear in a same range of pages is formed in said forming step.

19. The method according to claim 17, further comprising transmitting character rendering data corresponding to the grouped character of the transmitted registration command so that the target device can print the character using the character rendering data.

20. The medium according to claim 19, wherein the deletion command which instructs the target device to delete the grouped character which appears only in a page before the page on interest while transmitted character rendering data corresponding to the grouped character included in the group appears in the page of interest.

21. A computer readable medium having a computer program comprising a computer program code means for making a computer execute the steps of:

forming a separate group including a character which appears only in a page of interest from a group including a character which appears in plural pages;

registering the grouped character; and deleting the grouped character registered in said registration step.

22. The medium according to claim 21, wherein a group including characters which appears in a same range of pages is formed in said forming step.

23. The medium according to claim 21, further comprising registering character rendering data corresponding to the registered grouped character so as to print the character using the character rendering data.

24. The medium according to claim 23, wherein said deleting step deletes the grouped character which appears only in a page before the page of interest the page of interest.

25. A computer program product stored in a computer readable medium, comprising:

computer readable program means for causing a computer to form a separate group including a character which appears only in a page of interest from a group including a character which appears in plural pages;

computer readable program means for causing a computer to transmit a registration command which instructs a target device to register the grouped character included in the group; and computer readable program means for causing a computer to transmit a deletion command which instructs the target device to delete the grouped character registered in response to the registration command.

26. The computer program product according to claim 25, wherein a group including characters which appear in a same range of pages is formed.

27. The computer program product according to claim 25, further comprising computer readable program means for causing a computer to transmit character rendering data corresponding to the registered grouped character so that the target device can print the character using the character rendering data.

28. The computer program product according to claim 27, wherein the deletion command instructs the target device to delete the grouped character which appears only in a page before the page of interest while said computer readable program means for causing a computer to transmit character rendering data transmits character rendering corresponding to the grouped character included in the group appears in the page of interest.

29. A computer program product stored in a computer readable medium, comprising:

computer readable program means for causing a computer to form a separate group including a character which appears only in a page of interest from a group including a character which appears in plural pages;

computer readable program means for causing a computer to register the grouped character; and computer readable program means for causing a computer to delete the grouped character registered in said registering step.

30. The computer program product according to claim 29, wherein a group including characters which appear in a same range of pages is formed.

31. The computer program product according to claim 29, further comprising computer readable program means for causing a computer to register character rendering data corresponding to the registered grouped character so as to print the character using the character rendering data.

32. The computer program product according to claim 31, wherein the character included in the group including a character which appears only in a page before the page of interest is deleted while said computer readable program means for causing a computer to register character rendering data corresponding to the grouped character included in the group appears in the page of interest.

* * * * *

UNITED STATES PATENT AND TRADEMARK OFFICE
CERTIFICATE OF CORRECTION

PATENT NO. : 6,317,217 B1
DATED : November 13, 2001
INVENTOR(S) : Masanari Toda

It is certified that error appears in the above-identified patent and that said Letters Patent is hereby corrected as shown below:

Column 15,
Line 43, "wherein" should be deleted;
Line 54, "group appears" should read -- group that appears --;
Line 56, "separate" should read -- a separate --.

Column 16,
Line 13, "group" should read -- group that --;
Line 34, "group" should read -- group that --;
Line 58, "on" should read -- of --.

Column 17,
Claim 24, should read as follows:
-- 24. The medium according to claim 45, wherein said deleting step deletes the grouped character which appears only in a page before the page of interest while said registering step registers character rendering data corresponding to the grouped character included in the group that appears in the page of interest. --.

Column 18,
Line 6, "corresponding" should read -- data corresponding --;
Line 7, "group" should read -- group that --.

Signed and Sealed this

Fourteenth Day of May, 2002

*Attest:*

JAMES E. ROGAN
*Attesting Officer*   *Director of the United States Patent and Trademark Office*